United States Patent [19]

Ellington

[11] 4,264,894

[45] Apr. 28, 1981

[54] FAULT BYPASS FOR DATA TRANSMISSION SYSTEM

[76] Inventor: Stephen P. Ellington, 3010 Hickory La., LaGrange, Ky. 40031

[21] Appl. No.: 49,492

[22] Filed: Jun. 18, 1979

[51] Int. Cl.³ .......................... H04Q 9/00; H04B 3/46
[52] U.S. Cl. .......................... 340/147 SC; 179/175.3 R
[58] Field of Search ............... 340/147 SC, 151, 152; 179/15 AL, 175.2 R, 170, 175.3 R

[56] References Cited

U.S. PATENT DOCUMENTS

| | | | |
|---|---|---|---|
| Re. 28,958 | 9/1976 | Zafiropulo et al. | 340/147 SC |
| 2,229,090 | 1/1941 | Kinzer | 340/147 SC |
| 3,674,947 | 7/1972 | Chulak | 179/175.2 R |
| 4,015,241 | 3/1977 | Takezoe | 340/147 SC |
| 4,030,069 | 6/1977 | Henrickson et al. | 340/147 SC |
| 4,035,770 | 7/1977 | Sarle | 340/147 R |
| 4,068,105 | 1/1978 | Jain et al. | 179/175.3 R |
| 4,075,440 | 2/1978 | Laubengayer | 340/147 SC |
| 4,076,961 | 2/1978 | Holsinger et al. | 340/147 SC |
| 4,159,470 | 6/1979 | Strojny et al. | 340/147 SC |

*Primary Examiner*—Donald J. Yusko
*Attorney, Agent, or Firm*—Maurice L. Miller, Jr.

[57] ABSTRACT

An automatic fault detection and modem bypass circuit for a standard land line data transmission system containing a plurality of series connected modems arranged in a conventional hub configuration is disclosed. A relay is located in a central collecting station of the hub and connected so as to open an input line to at least one of the modems and an output line from a line amplifier connected to an output line of the same one of the modems upon the occurrence of a fault in the input line to such modem. A series connected combination of an amplifier and a switching transistor is responsively connected to the output line of such modem and operatively connected to the coil of the relay to simultaneously disconnect such modem from the series connected hub group and connect an output line from a line amplifier immediately preceeding such modem in the series connected group to an input line of a modem which next succeeds such modem in the group. Means is provided for listening to the various signals on the input and output lines to and from each of the modems to enable a trained operator to locate faults in the system by sound. An additional feature includes a relay switch connected between the output terminals of a modem and its output line which is responsive to a fault on the input line to such modem so that the automatic bypass circuit can be made to remove the modem from the series connected group upon the occurrence of a fault on either an input or an output line to or from such modem. The circuit of the disclosure permits a given modem in a series connected group of modems to be removed from the group without disrupting the operation of the remaining modems in the group.

12 Claims, 3 Drawing Figures

FAULT BYPASS FOR DATA TRANSMISSION SYSTEM

BACKGROUND OF THE INVENTION

This invention relates generally to an automatic fault detecting and modem bypass circuit for use in connection with a digital data transmission loop system.

Referring to FIG. 1 of the drawings, a typical telephone cable data transmission hub portion of a data transmission loop of the type well known in the prior art is shown. Typically, a controller 10 such as an IBM 3604 which is centrally located as at the main headquarters of a bank or savings and loan institution is connected to a modem 12. The modem 12 performs the input/output or modulate/demodulate function of the data transmission system in a well known manner. Typical systems such as the IBM 3600 employ a controller and modem which supply a carrier signal which can be frequency shift-keyed in a well known manner to transmit digital information about the loop to a plurality of remotely located modems 14. The various modems 14 are series connected with one another through various two-wire modem input and output lines 16 and 18, respectively, which extend to and from a more or less centrally located collecting station 20. A main line 22 consisting of a pair of input and output cables supplies information between the controller 10 and various remotely located and series connected modems 14 by way of the collecting station 20. Within the central collecting station 20, the various modem input and output lines 16 and 18 are series connected through conventional line amplifiers 24. The hub collecting station 20 may and often is one of many collecting stations connected to the controller 10. Additional hub portions, each having such central collecting stations may be connected to the controller 10 such as indicated by means of additional main lines 26, 28 to form a group of hubs connected in parallel with the controller 10, the result being a complete loop system.

One of the difficulties that has occurred in such systems results from the fact that each hub portion, often containing as many as 15 modems, will be lost when a fault occurs in any one of the modems 14 or modem input or output lines 16, 18 since the series circuit connecting the group of modems 14 in the hub would then be open. Tracking down such a fault is an expensive and often time-consuming job during which time all of the modems 14 in the hub portion of the system are inoperative.

By means of my invention, this and other prior art difficulties often encountered in such transmission systems of the prior art are substantially overcome.

SUMMARY OF THE INVENTION

It is one object of my invention to provide an automatic modem disconnect circuit for a land line data transmission system containing a plurality of series connected modems upon the occurrence of a fault on an output line from at least one of the modems.

It is another object of my invention to provide a fault sensing circuit for detecting a fault on an input line to at least one modem of a plurality of modems arranged in a series connected group and for simulating a fault on an output line from such modem upon the occurrence of a fault on the input line to such modem.

It is yet another object of my invention to provide means for listening to the signals on the input and output lines extending to and from each modem of a plurality of modems arranged in a series connected group for enabling an experienced operator to locate faults on such input and output lines by sound.

Briefly, in accordance with the principles and objects of my invention, there is provided a land line data transmission system of the type which includes a plurlity of modems, a collecting station, a plurality of input and output lines, a plurality of line amplifiers located in the collecting station, and controller means. The modems are series connected with one another through the amplifiers and the input and output lines to form a series connected hub group of the amplifier and modems. The controller means is connected between an input line to a first of the modems through one of the amplifiers and an output line of a last of the modems through another of the amplifiers. Within such system, there is provided an automatic modem disconnect circuit which includes switching means disposed in the collecting station for disconnecting, upon command, an input line to at least one of the modems and an output line from one of the amplifiers which is connected to an output line of the one modem. The switching means also simultaneously connects an output line from an amplifier immediately preceding the one modem to an input line of a modem next succeeding the one modem. Lastly, means is disposed in said collecting station which is responsively associated with an output line of the one modem for operating the switching means to switch the one modem out of the group upon the occurrence of a fault in the output line of the one modem.

These and other objects of my invention will become apparent to those skilled in the art from the following detailed description and attached drawings upon which, by way of example, only the preferred embodiments of the invention are illustrated.

DESCRIPTION OF THE PREFERRED EMBODIMENTS

Figure 1:
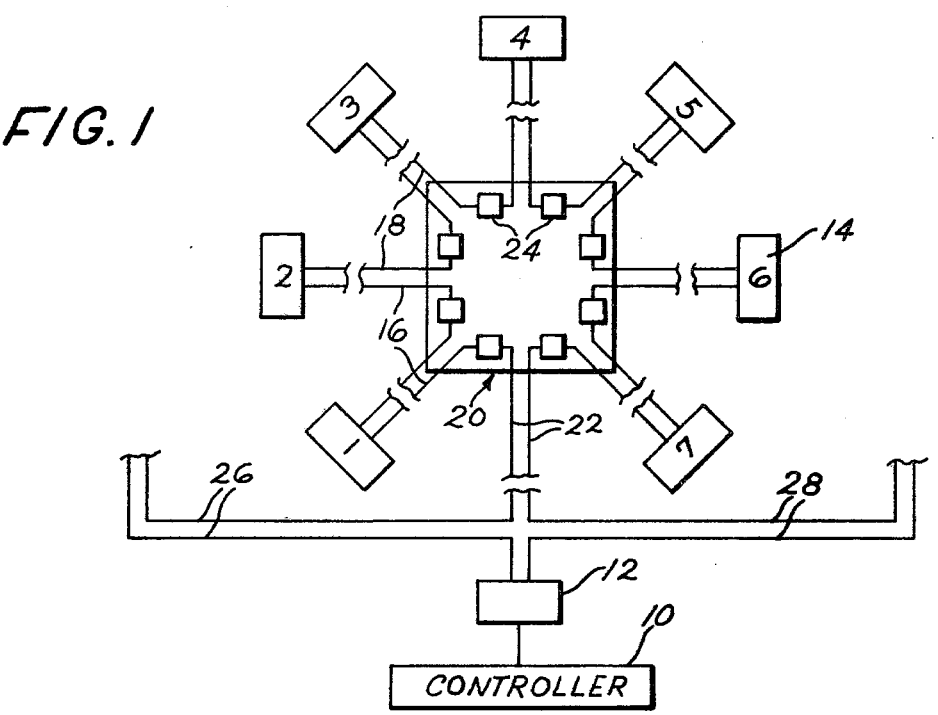
FIG. 1 shows a schematic diagram of a hub portion of a land line data transmission loop system of the type generally known in the prior art.
Figure 2:
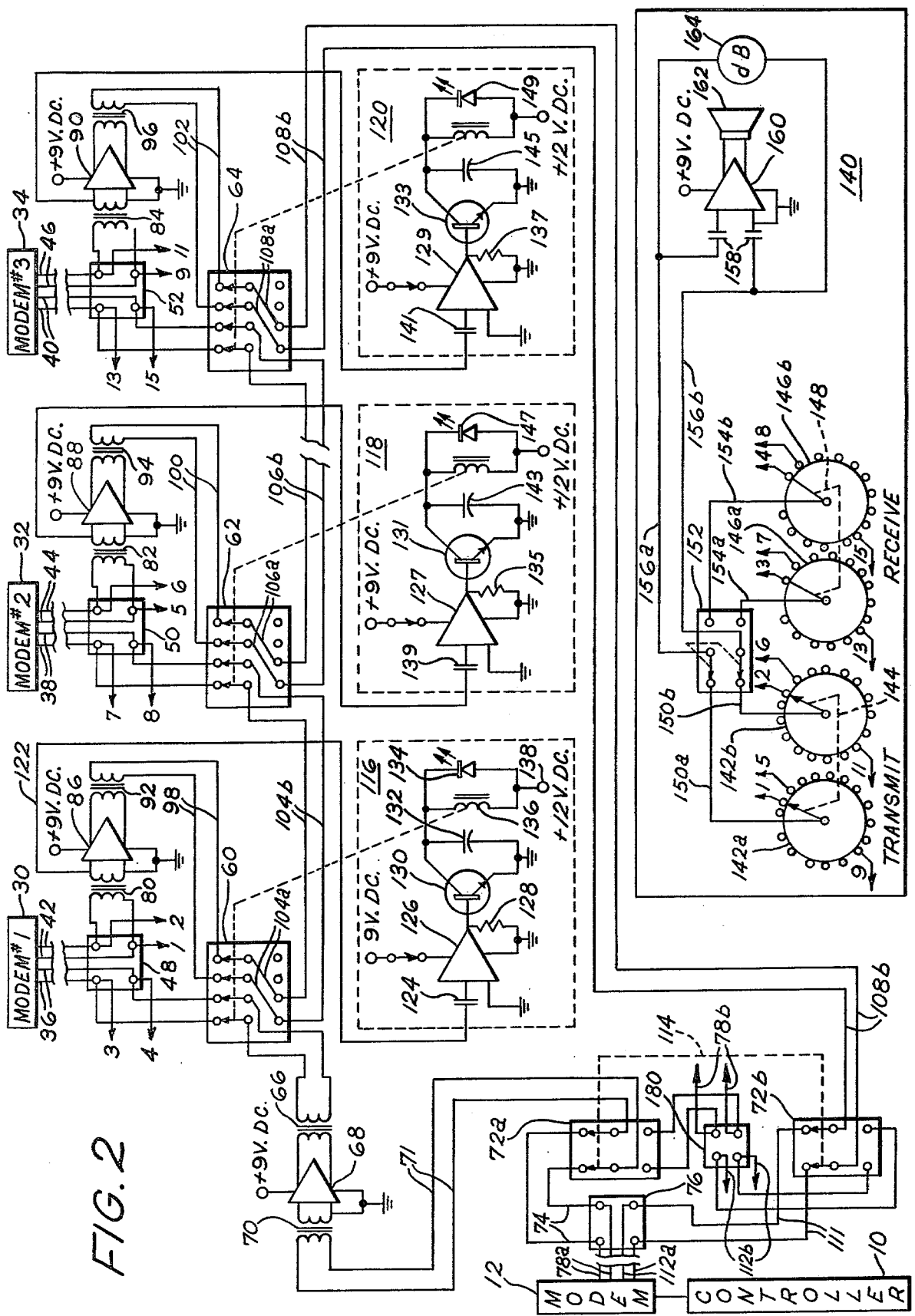
FIG. 2 shows a modem disconnect circuit for removing an individual modem from a series connected group of modems arranged in a hub circuit of the type generally illustrated in FIG. 1 upon the occurrence of a fault in the individual modem or its output lines.

Referring now to FIG. 2, there is shown, in one preferred embodiment of my invention, a land line data transmission system containing a fault detection and modem bypass means including a series of remotely located modems 30, 32 and 34 having a pair of modem input lines 36, 38 and 40, respectively, and a pair of modem output lines 42, 44 and 46, respectively. The line pairs 36-46 may be conventional telephone cable transmission line which extend between each of the remotely located modems 30-34 and a central collecting station for a given hub, such as the station 18 of FIG. 1. At the collecting station, the input and output line pairs 36-46 to and from each of the modems 30-34 connect into a different one of a series of modem terminal blocks 48, 50 and 52.

The input terminals of the blocks 48, 50 and 52 are connected by means of lines 54, 56 and 58 respectively to a pair of terminals on the same side of different ones of a series of 4 pole, double throw relays 60, 62 and 74, respectively. In the present example, the modem 30 is the first of the group of modems 30-34 series connected through the relays 60-64 to form a hub system of the type generally illustrated in FIG. 1. Accordingly, the switch arm terminals of the relay 60, which are connectable to the modem input lines 54, are connected to the secondary of an output transformer 66 of an audio line amplifier 68. The primary winding of an input transformer 70, whose secondary winding is connected to the input terminals of the amplifier 68, is connected through a pair of lines 71 to the switch arm terminals of a double pole, double throw switch 72a. One set of terminals connectable to the arms of the switch 72a constituting the input terminals thereof, are connected by means of a pair of lines 74 to the input terminals of a main hub terminal block 76 which joins the main modem terminal 12 located remote with respect to the collecting station by means of hub input transmission lines 78a.

Output signals from each of the modems 30, 32 and 34 appearing on lines 42, 44 and 56, respectively, are presented to the output terminals of the blocks 48, 50 and 52 located at the hub collecting station where such signals are presented to the primary windings of input transformers 80, 82 and 84 of a series of line amplifiers 86, 88 and 90, respectively. In turn, the output terminals of the line amplifiers 86, 80 and 90 are connected through audio line transformers 92, 94 and 96, respectively, and through lines 98, 100 and 102 to the remaining two output terminals on the output side of the relays 60, 62 and 64, respectively. The switch arms of the relays 60-64, connectable to the return lines 98, 100 and 102, are connected by means of jumpers 104a, 106a and 108a, respectively, to a pair of input terminals on the relays 60-64, respectively, opposite the relay output terminals to which the modem input lines 54, 56 and 58 are joined. In turn, the same input terminals to which the jumpers 104a, and 106a are joined, are connected by means of lines 104b and 106b to the switch arm terminals of the relays 62 and 64 which are connectable to the modem input lines 56 and 58. Since, in the present example, the modem 34 is the last modem in the series connected hub group, a pair of lines 108b connected to the jumpers 108a on the relay 64 returns to the switch arm terminals of a double pole, double throw switch 72b so as to be connectable through the switch arms thereof to a pair of lines 111 back to return terminals located on the block 76 and thereafter through return transmission lines 112a to the main modem 12 to complete the series connected hub group. The switches 72a,b are ganged together as indicated by a dashed line 114. In the alternative, the switches 72a,b may be combined into a single 4 pole, double throw switch.

The relays 60, 62 and 64 are operated independently of one another by means of fault sensing circuits 116, 118 and 120, respectively. Since the circuits 116, 118 and 120 are identical, only the circuit 116 need be explained as follows. One leg of the secondary coil of the input transformer 80 is connected by means of a line 122 through a capacitor 124 to the input terminal of an a.c. amplifier 126. The output terminal of the amplifier 126 is connected across a resistor 128 forming a fixed load and the base-emitter junction of a switching transistor 130. The collector of the transistor 130 is connected to ground through a capacitor 132 and to one side of a parallel combination of a light-emitting diode 134 and a coil 136, the latter being the relay coil for the relay switches 60.

Now so long as a signal is supplied from the modem output lines 42 to the transformer 80, a signal will remain on the line 122 to be amplified by the amplifier 126 as a result of which the collector-base junction of the transistor 130 will remain conductive to effectively maintain the coil 136 connected between a 12 volt d.c. supply terminal 138 and ground. So long as the coil 136 is thus energized, the switch arms of the relay 60 will remain in the position as shown in FIG. 1 to maintain the modem 30 connected within the series connected circuit of modems 30, 32 and 34. However, should a fault occur either by loss of output signal from the modem 30 or disruption of the modem output line 42 or for any other reason that would cause the loss of signal ordinarily supplied to the transformer 80, the line 122 will go dead to cause the output circuit of the transistor 130 to open to, in turn, eliminate current flow through the coil 136, whereupon the relay switches 60, shown in FIG. 1 in their energized position, will become de-energized. As a result, the switch arms of the relay 60 will switch the secondary winding of the transformer 66 from its normal connection to the modem input lines 54 to a connection with the lines 104b to bypass the modem 30 and remove the latter from the series circuit altogether. Note that when the coil 136 becomes de-energized to switch the relay 60 to remove the modem 30 from the hub system of which it is normally a series connected part, the LED 134 is turned off thus indicating to an observer at the collecting station that the modem 30 is not supplying a carrier signal along the line 42 back to the collecting station. Accordingly, the observer is alerted to investigate for a fault in or between the modem 30 and the transformer 80 at the collecting station.

An additional feature of the circuit of the present example is an audio detector circuit 140 for enabling a trained operator located at the hub collecting station to locate faults by listening to the audio signals on the various modem input or receive lines 36, 38 and 40, which convey data from the collecting station to the individuals modems 30, 32 and 34, and to the audio signals on the various modem output or transmit lines 42, 44 and 46 which convey data from the individual modems 30, 32 and 34 back to the collecting station. By listening to these signals, an experienced operator can determine whether the information being supplied to or from a modem is a sharp and clear data signal or noise and other spurious signals indicative of a fault in the system. By switching successively between the transmit and receive lines to and from each modem, a fault can often be localized quite readily.

The circuit 140 includes a pair of multi-position-transmit switches 142a,b, ganged together as indicated by a dashed line 144 and a pair of multi-position receive switches 146a,b, ganted together as indicated by a dashed line 148. The switch arm terminals of the ganged transmit switches 14a,b are connected by means of a pair of lines 150a,b to one side of a double pole, double throw transmit/receive switch 152. Similarly, the switch arm terminals of the ganged receive switches 146a,b are connected by means of a pair of lines 154a,b to the other side of the switch 152. The various switch terminals of the switch 142a, such as those designated 1, 5 and 9, for example, are connected to the correspondingly numbered terminals on the modem terminal blocks 48, 50 and 52 which are, in turn, connected to one of the pair of lines 42, 44 and 46 which transmit signals from the various modems 30, 32, 34 to the collecting station. The corresponding switch terminals of the switch 142b, such as those designated 2, 6 and 11, for example, are connected to the corresponding numbered terminals on the modem terminal blocks 48, 50 and 42 which are, in turn, connected to the other of the pair of lines 42, 44 and 46. Thus, for example, when the switches 142a,b are in the terminal positions 1 and 2, respectively, as indicated in FIG. 1, the signal being transmitted from the modem 30 to the collecting station is received by the switches 142a,b and delivered by the lines 150a,b to one side of the switch 152. With the switch 152 in the position as shown in FIG. 1, the signal on the lines 150a,b is supplied through the switch arms to a pair of lines 156a,b and through a pair of capacitors 158 to the input terminals of an audio amplifier 160, whereafter the amplified signal is converted to audible sound by a speaker 162. A standard audio level meter 164 may be connected between the lines 156a,b as shown to provide visual means for monitoring the data signal supplied to the amplifier 160.

The input or receive lines 36, 38 and 40 are selected by the receive switches 146a,b for audible monitoring in the same manner. For example, the receive switch terminals 3 and 4 of the switches 146a,b are connected to correspondingly numbered terminals 3 and 4 on one side of the modem terminal block 48 to permit listening to the modem input or receive lines 36. By switching the position of the switch arms of the switches 154a,b, other of the modem receive lines 38 and 40 can be monitored as desired. To monitor the receive lines 36, 38 and 40, the switch 152 must first be placed in the receive position, opposite its position as shown in FIG. 1.

Figure 3:
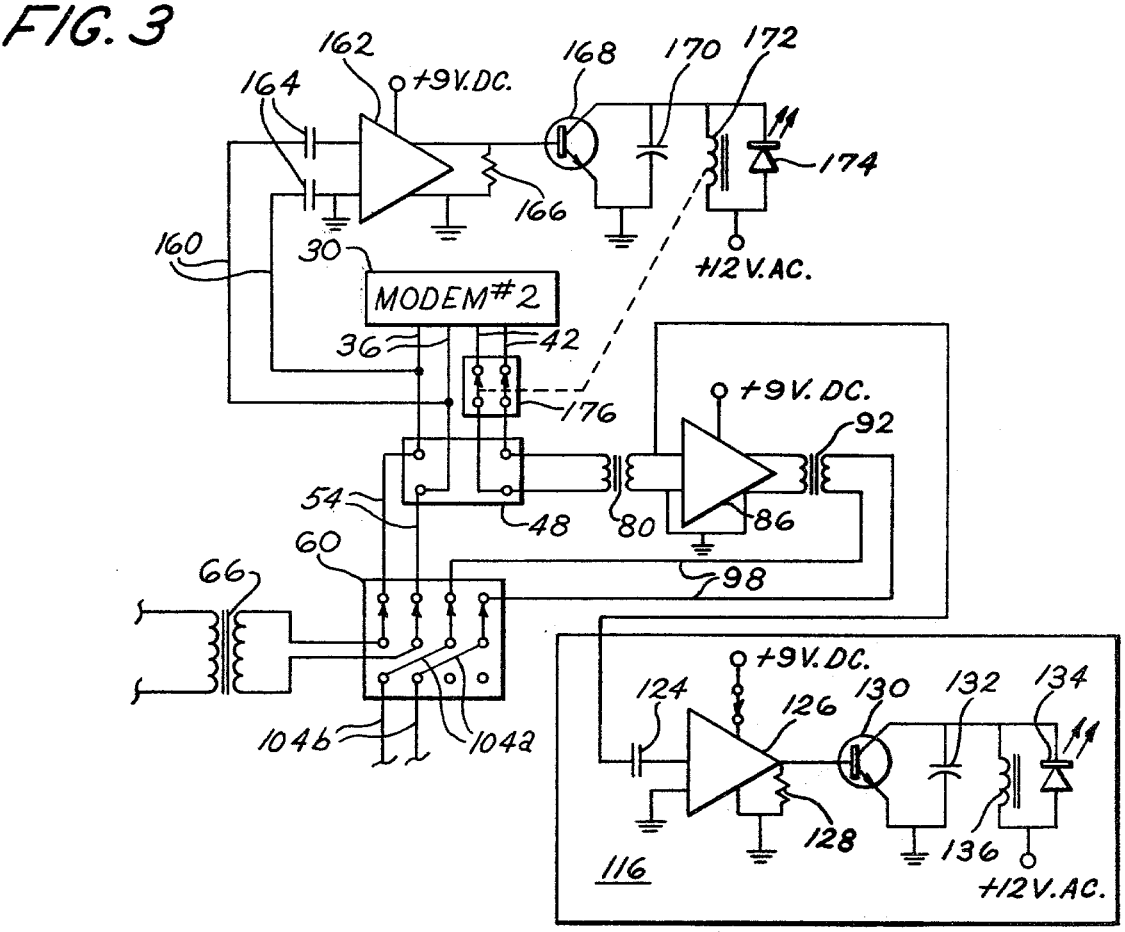
FIG. 3 shows a fault sensing circuit for optional use in the circuit of FIG. 2 for simulating a fault in an individual modem output line to actuate the disconnect circuit of FIG. 2 upon the occurrence of a fault on an input line of the modem.

Referring now to FIG. 3, there is shown a modem input fault detecting circuit for actuating the automatic disconnect circuit 116 for removing the modem 30 from the hub system of FIG. 1 upon the occurrence of a fault on the input line 36. A pair of lines 160 are connected between the input line 36 and a line amplifier 162 through a pair of capacitors 164. The amplifier 162 operates into a fixed load resistance 166 and the base-emitter junction of a switching transistor 168. The collector-emitter junction of the transistor 168 is connected across an a.c. bypass capacitor 170, a 12 volt relay coil 172 and a 12 volt LED 174. The relay coil 172 is magnetically associated in actuating relationship to the switch arms of a single pole, double throw relay 176 connected in series with the modem output lines 42. The circuit is adjusted so that the transistor 168 remains conductive to keep the coil 172 energized and thus maintain the relay 176 closed so long as there is a carrier signal on the modem input lines 36. When a fault occurs in the lines 36 so that a signal is lost at the input terminals of the amplifier 162, the collector-emitter junction of the transistor 168 opens, thus deenergizing the coil 172 and opening the relay switches 176. When the relay switches 176 open, the signal generated by the modem 30 is removed from the transformer 80 such that the automatic bypass circuit 116 is actuated to remove the modem 30 from the hub system of FIG. 2 just as occurs when a fault appears on the modem output lines 42 in the example of FIG. 1. Thus, the circuit of the present example is sensitive to a fault occurring on an input or receive line 36 to the modem 30 and operates in such a way as to open the relay 176 to simulate a fault on the modem output or transmit lines 42.

In the event that a fault occurs on either or both of lines 78a or 112a leading between the main modem 12 and the main hub terminal block 76, a backup system is provided wherein the switches 72a,b may be thrown to the position opposite that shown in FIG. 2 to permit the modem 12 to be joined to backup hub input and output transmission lines 78b and 112b, respectively, which will then join the modem 12 to the line pairs 71 and 108b, respectively, through a terminal block 180.

To form a complete example of the present invention, the following table lists suggested component values for the circuits of FIGS. 2 and 3.

| COMPONENTS OF FIGS. 2 & 3 | DESCRIPTION |
|---|---|
| Modems 12, 30, 32, 34 | IBM 3603 |
| Amplifiers 68, 86, 88, 90, 126, 127, 129, 160, 162 | Radio Shack 277-1008-9 |
| Transformers 66, 70, 80, 82, 84, 92, 94, 96 | Triad TY304P |
| Relays 60, 62, 64 | Potter & Brumfield 17D11-12v |
| Relay 176 | Potter & Brumfield 17D11-12v (using only 2 of its 4 poles) |
| Transistors 130, 131, 133, 168 | Sylvania ECG 186 |
| Resistors 128, 135, 137, 166 | 68 Ohm, ¼ Watt |
| Capacitors 124, 139, 141, 158, 164 | 0.01 mfd., 100v |
| Capacitors 132, 143, 145 | 50 mfd., 25v |
| LEDs 134, 147, 149, 174 | IDI B219111-12v |
| Rotary switches 142, 146 | Centralab PA 3003 2 pole, 17 position |

It should be noted in the example of FIG. 2 that the lines 106b which extend from the relay 62 toward the relay 64 have been cut to illustrate that the hub portion of the loop system shown may contain additional modems linked in series with one another and in series with the modems 30, 32 and 34. Loop systems of this general type may contain as many as 15 or more modems, which modems may all be included in a single hub circuit, or spread between several series connected hubs as indicated in FIG. 1 by hub main lines 20, 22 and 28. However, for illustrative purposes and since all of the series connected circuits of the modems 30, 32 and 34 of the present examples are identical, only three such modem circuits are shown in FIG. 2 though it is to be understood that as many as 15 modems might be present in such a loop circuit.

Although the subject invention has been described with respect to specific details of certain preferred embodiments thereof, it is not intended that such details limit the scope of the present invention otherwise than as set forth in the following claims.

I claim:

1. In a land line data transmission system of the type which includes a plurality of modems, a collecting station, a plurality of input and output lines, each of said modems being joined to said collecting station by a different pair of said input and output lines, a plurality of line amplifiers located in said collecting station, said modems being connected in series with one another in said collecting station through said amplifiers and input and output lines to form a series connected hub group of said amplifiers and modems, and controller means connected between an input line to a first of said modems through one of said amplifiers and an output line from a last of said modems through another of said amplifiers, an automatic modem disconnect circuit comprising switching means disposed in said collecting station for disconnecting, upon command, an input line to at least one of said modems and an output line from one of said amplifiers which is connected to an output line of said one of said modems, and for simultaneously connecting an output line from an amplifier immediately preceeding said one of said modems to an input line of a modem next secceeding said one of said modems, and means disposed in said collecting station and responsively associated with an output line of said one of said modems for operating said switching means to switch said one of said modems out of said group upon the occurrence of a fault in the output line of said one of said modems.

2. The system of claim 1 wherein said switching means comprises a 4 pole, double throw relay.

3. The system of claim 1 wherein said operating means comprises a relay coil associated with said switching means, and a switching transistor responsively associated with said modem output line and operatively associated with said relay coil.

4. The system of claim 1 further comprising means switchably connected to said modem input and output lines for generating an audible signal representative of the signals on each of said modem input and output lines.

5. The system of claim 1 further comprising means for simulating a fault on an output line of said one of said modems upon the occurrance of a fault on an input line to said one of said modems.

6. The system of claim 3 wherein said operating means further comprises amplifier means connected between said modem output line and said switching transistor.

7. The system of claim 4 wherein said switchably connected means comprises an audio amplifier, a speaker responsively connected to said audio amplifier, multi-position modem transmit switching means for selectively connecting each of said modem output lines to said audio amplifier, multi-position modem receive switching means for selectively connecting each of said modem input lines to said audio amplifier, and means connected between said audio amplifier and transmit and receive switching means for selectively connecting said transmit or receive switching means to said audio amplifier.

8. The system of claim 5 wherein said fault simulating means comprises relay switching means connected between said one of said modems and said modem output line for opening said connection between said one of said modems and said modem output line on command, and means responsively connected to an input line of said one of said modems at a point relatively near the input terminals of said one of said modems and operatively associated with said relay switching means for opening said connection upon the occurrence of a fault on said modem input line.

9. The system of claim 1 further comprising means for switching said controller means out of contact with said first modem input line and said last modem output line and into contact with a backup first modem input line and a backup last modem output line.

10. A closed loop data transmission system comprising a system controller, a plurality of modems, a collecting station, said controller and modems being connected in series with one another in said collecting station of form a closed loop data transmission circuit, switching means disposed in said collecting station for disconnecting, upon command, at least one of said modems from said circuit and for maintaining the remainder of said modems and said controller in series connection with one another, and means disposed in said collecting station for automatically operating said switching means upon the occurrence of a data transmission interrupting fault in an output line extending from said modem to said collecting station.

11. The system of claim 10 further comprising means switchably connected to said modem input and output lines for generating an audible signal representative of the signals on each of said modem input and output lines.

12. The system of claim 10 further comprising means for simulating a fault on an output line of said modem upon the occurrence of a fault on an input line to said modem.

* * * * *